No. 820,874. PATENTED MAY 15, 1906.
J. S. JELLISON.
FRICTION CLUTCH.
APPLICATION FILED APR. 29, 1905.
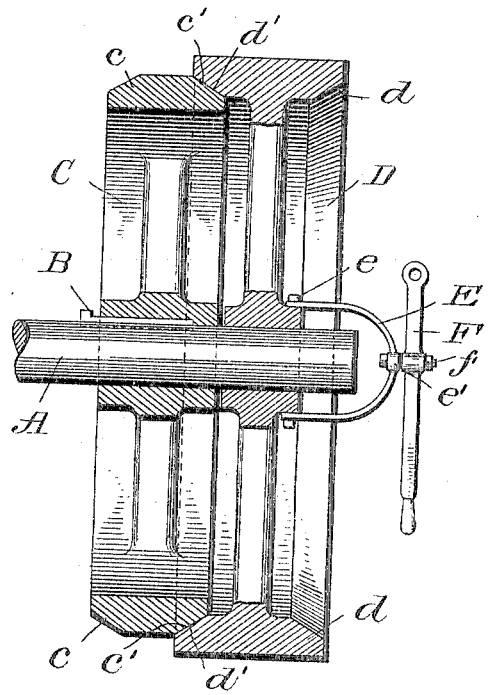
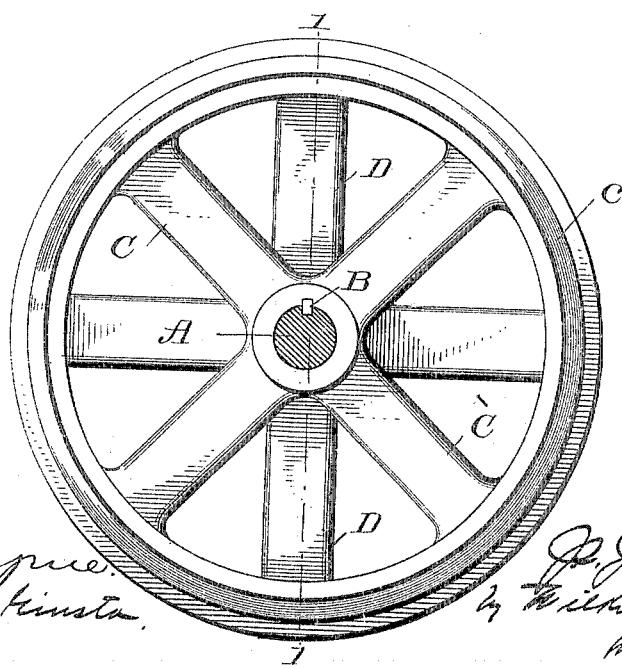
Witnesses
Inventor

UNITED STATES PATENT OFFICE.

JOHN S. JELLISON, OF BOISE, IDAHO.

FRICTION-CLUTCH.

No. 820,874.　　　　Specification of Letters Patent.　　　　Patented May 15, 1906.

Application filed April 29, 1905. Serial No. 258,136.

*To all whom it may concern:*

Be it known that I, JOHN S. JELLISON, a citizen of the United States, residing at Boise, in the county of Ada and State of Idaho, have invented certain new and useful Improvements in Friction-Clutches; and I do hereby declare the following to be a full, clear, and exact description of the invention, such as will enable others skilled in the art to which it appertains to make and use the same.

This invention relates to improvements in friction-clutches for shafting, and is especially designed to provide clutch members, one of which at least is provided with a plurality of beveled friction-surfaces adapted to coöperate with a beveled friction-surface on the other member, whereby when the old working surface is worn a new working surface may be brought into action by the reversal of the position of the particular member on the shafting.

Other objects and advantages will appear from the following description, the particular features of novelty being pointed out more succinctly in the claims.

Broadly speaking, therefore, the invention consists in providing at least one of the clutch or coupling members with a plurality of working surfaces, and so far as this broad idea is concerned the beveled working surfaces of the members may be disposed centrally or at the hub portion of the members, and this especially when a small amount of power is to be used, or, as illustrated in the drawings, on the rims of the members when greater power is desired.

To more fully understand the invention, reference is had to the accompanying drawings, forming a part of the present application, and in which like letters designate the same parts in the views, and in which—

Figure 1 is a section on the line 1 1 of Fig. 2, and Fig. 2 is a view in side elevation looking to the right in Fig. 1.

A designates the shafting, to which is keyed by means of the key B one member C of the friction-clutch. Adjacent said member C and freely rotatable on said shaft independently thereof is a friction member D. For the purpose of illustration I have shown the freely-rotatable member D, which may be in the nature of a driving-pulley, as being internally beveled on its rim, as at $d d'$, forming the female member of the clutch. I have also shown the keyed member C peripherally beveled, as at $c c'$ and forming the male member of the clutch.

Any suitable means may be provided for throwing the members in clutch; but for the purpose of illustration and for that purpose only I have shown in the drawings a clevis E, secured at its end in any suitable way, as by bolts $e$, to the hub of the female member D. The body portion of this clevis is provided centrally with a hollow bearing $e'$, positioned to aline with the center of the shafting A, and within the bearing $e'$ is arranged the swivel-pin $f$, carried by the operating-lever F.

The operation of the device is apparent, it being obvious that by swinging the operating-lever F to the left or right the members will be thrown into and out of clutch, respectively, and the frictional contact between the friction-faces will be regulated by the degree of power applied to the lever, whereby the speed can be regulated to an extent without appreciable wear and also the clutch members may be slowly and positively forced together regardless of the amount of power to be expended in operating the shafting and its work, no stopping of the machinery being necessary for adjusting the clutch mechanism.

Although in the foregoing I have described and in the drawings have illustrated the preferred form of my invention, it will be understood that I have done so primarily for the purpose of illustration, and I do not wish to limit myself to the details as shown and described, it being obvious that many modifications might be made without departing from the spirit of the invention; but 1. The combination with suitable shafting, of a pair of clutch members respectively secured to and rotatably mounted on said shafting, one of said members being reversible and provided with a plurality of beveled friction-faces adapted to engage with a beveled friction-face on the other said member, and means rigidly attached to the rotatably-mounted member for operating one of said members relatively to the other.

2. The combination with suitable shafting, of a pair of reversible clutch members respectively secured to and rotatably mounted on said shafting and provided with a plurality of coöperating friction-faces, and means rigidly attached to the rotatably-mounted member for throwing said members in clutch.

3. The combination with suitable shafting, of a pair of reversible clutch members respectively secured to and rotatably mounted on said shafting and provided with a plurality of coöperating beveled friction-faces, and means rigidly attached to the rotatably-mounted member for throwing said members in clutch.

4. The combination with suitable shafting, of a clutch comprising an externally-beveled male member and an internally-beveled female member, one of said members being secured to and the other rotatably mounted on said shafting and one of said members being reversible and provided with a plurality of beveled faces adapted to engage the beveled face of the other member, and means rigidly attached to the rotatably-mounted member for throwing said members in clutch.

5. The combination with suitable shafting, of a clutch comprising a male and female member, one of said members being secured to and the other rotatably mounted on said shafting, and said male member being reversible and provided with a plurality of beveled friction-faces adapted to engage a beveled friction-face on said female member, and means rigidly attached to the rotatably-mounted member for throwing said members in clutch.

6. The combination with suitable shafting, of a pair of reversible clutch members respectively provided with a plurality of external and internal coöperating beveled friction-faces, one of said members being secured to the shaft and the other said member rotatably mounted thereon, and means rigidly attached to the rotatably-mounted member for throwing said members in clutch.

7. The combination with suitable shafting, of a reversible friction-pulley, keyed to said shafting, and provided with a plurality of beveled peripheral faces, a loose pulley on said shafting provided with an internally-beveled rim forming a friction-face adapted to be brought into engagement with the friction-faces of said other pulley, and means rigidly attached to the rotatably-mounted member for throwing said pulleys in clutch.

In testimony whereof I affix my signature in presence of two witnesses.

JOHN S. JELLISON.

Witnesses:
R. H. JOHNSON,
A. T. DALEY.